(12) United States Patent
Hardikar et al.

(10) Patent No.: US 10,890,082 B2
(45) Date of Patent: Jan. 12, 2021

(54) ASPIRATING FACE SEAL TOOTH CONFIGURATION

(71) Applicant: GENERAL ELECTRIC COMPANY, Schenectady, NY (US)

(72) Inventors: Narendra Anand Hardikar, Karnataka (IN); Nathan Evan McCurdy Gibson, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 106 days.

(21) Appl. No.: 16/098,561

(22) PCT Filed: Apr. 28, 2017

(86) PCT No.: PCT/US2017/030210
§ 371 (c)(1),
(2) Date: Nov. 2, 2018

(87) PCT Pub. No.: WO2017/196563
PCT Pub. Date: Nov. 16, 2017

(65) Prior Publication Data
US 2019/0093496 A1 Mar. 28, 2019

(30) Foreign Application Priority Data
May 11, 2016 (IN) .............................. 201641016504

(51) Int. Cl.
*F16J 15/34* (2006.01)
*F01D 11/02* (2006.01)
(Continued)

(52) U.S. Cl.
CPC .......... *F01D 11/025* (2013.01); *F01D 11/003* (2013.01); *F01D 11/02* (2013.01);
(Continued)

(58) Field of Classification Search
CPC ...... F01D 11/025; F01D 11/02; F01D 11/003; F01D 11/00; F02C 7/28; F16J 15/164;
(Continued)

(56) References Cited

U.S. PATENT DOCUMENTS 5,975,537 A * 11/1999 Turnquist ............... F16J 15/443
277/411
6,676,369 B2 * 1/2004 Brauer .................. F01D 11/025
415/113
(Continued)

FOREIGN PATENT DOCUMENTS

EP 2657464 A2 10/2013

OTHER PUBLICATIONS

International Search Report and Written Opinion dated May 11, 2016 which was issued in connection with PCT application No. PCT/US17/030210 which was filed on Apr. 28, 2017.

*Primary Examiner* — Nathan Cumar
(74) *Attorney, Agent, or Firm* — Dority & Manning, P.A.

(57) ABSTRACT

An aspirating face seal between high and low pressure regions of a turbomachine at a juncture between rotatable and non-rotatable members of turbomachine includes gas bearing rotatable and non-rotatable face surfaces. A starter seal tooth and optional deflector seal tooth are mounted on a seal teeth carrier on the rotatable member. The primary seal tooth and non-rotatable face surface are mounted on an annular slider on the non-rotatable member. A pull-off biasing means urges the annular slider away from the rotatable member and the non-rotatable face surface away from the rotatable surface. A secondary seal is in sealing engagement with the annular slider in the low-pressure region and the pull-off biasing means is located radially outwardly of the annular slider in the high pressure region.

18 Claims, 12 Drawing Sheets

(51) Int. Cl.
*F02C 7/28* (2006.01)
*F01D 11/00* (2006.01)
*F16J 15/447* (2006.01)
*F16J 15/16* (2006.01)

(52) U.S. Cl.
CPC .............. *F02C 7/28* (2013.01); *F16J 15/164* (2013.01); *F16J 15/342* (2013.01); *F16J 15/4476* (2013.01)

(58) Field of Classification Search
CPC .. F16J 15/16; F16J 15/182; F16J 15/34; F16J 15/342; F16J 15/3404; F16J 15/4476; F16J 15/447
USPC ........................................................ 277/409
See application file for complete search history.

(56) References Cited

U.S. PATENT DOCUMENTS

| | | | | |
|---|---|---|---|---|
| 6,758,477 | B2 * | 7/2004 | Brauer .................... | F01D 11/02 277/379 |
| 2003/0184022 | A1 * | 10/2003 | Brauer .................... | F01D 11/02 277/412 |
| 2003/0185669 | A1 * | 10/2003 | Brauer .................. | F01D 11/025 415/111 |
| 2012/0251290 | A1 * | 10/2012 | Turnquist .............. | F01D 11/001 415/1 |
| 2014/0053394 | A1 * | 2/2014 | Cooper .................. | F01D 25/14 29/726 |

* cited by examiner

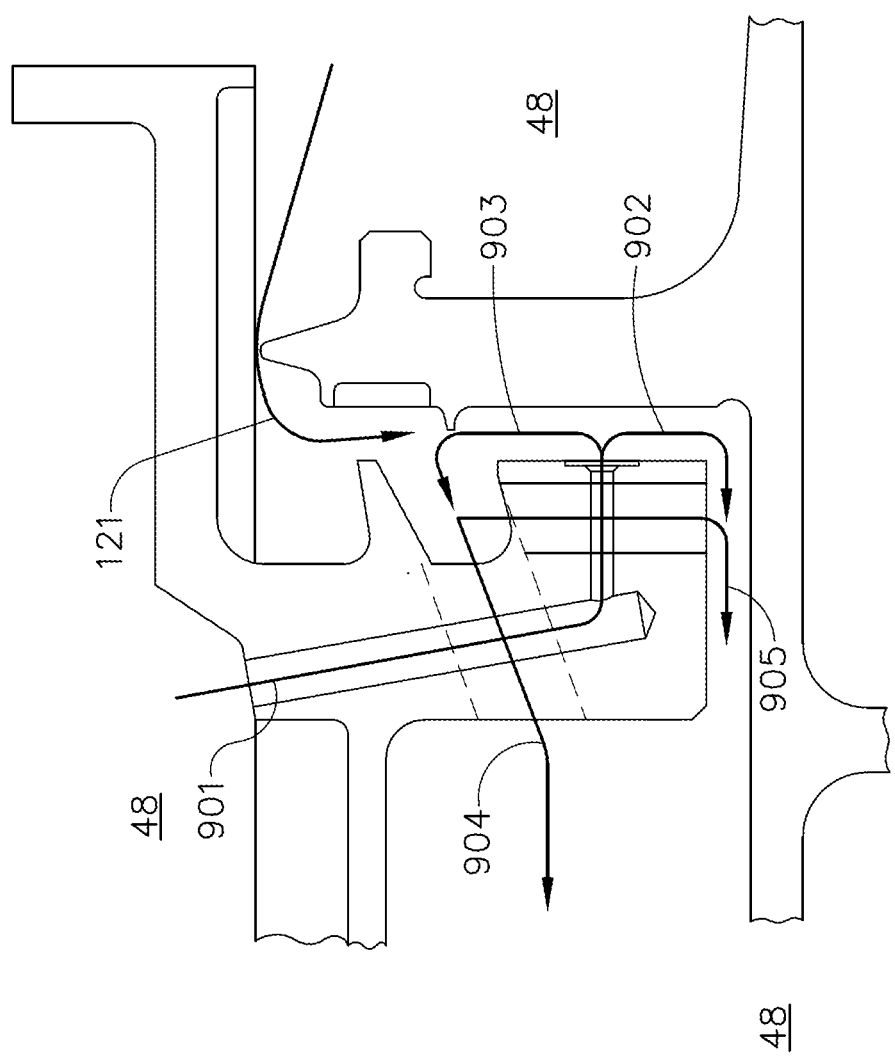

ASPIRATING FACE SEAL TOOTH CONFIGURATION

BACKGROUND OF THE INVENTION

The present invention relates generally to aspirating face seals between rotor and stator assemblies and, more particularly, to an aspirating face seal having seal teeth.

Aspirating face seals are used to minimize leakage through a gap between two components and from a higher pressure area to a lower pressure area. Such seals have been disclosed for use in rotating machinery, including, but not limited to, turbomachinery such as gas turbine engines used for power generation and for aircraft and marine propulsion. Aspirating face seals are designed to minimize leakage of a fluid such as compressed air or combustion gases between a rotor and a stator in gas turbine engines. Aspirating face seals may facilitate compensating for transient variations that may exist in gaps between components. Aspirating face seals control fluid leakage in the engine by restricting fluid flow from areas of higher pressure to areas of lower pressure and be positioned between an engine stationary member and a rotating member within the engine.

Fluid leakage through gas turbine engine seal assemblies may significantly increase fuel consumption and adversely affect engine efficiency. Additionally, fluid leakage may cause damage to other components and/or increase overall engine maintenance costs. Because of the location of the seal assemblies and/or the operating environment, at least some known seal assemblies may deteriorate over time.

Some embodiments of aspirating face seals have the rotor configured as oppositely facing first and second seal elements often referred to as annular teeth with the first seal element either being attached to, or being a monolithic portion of, the rotor. Likewise, such seals typically have the stator configured as the second seal element with the second seal element either being attached to, or being a monolithic portion of, the stator.

U.S. Pat. No. 6,676,369 to Brauer, et al., issued Jan. 13, 2004, and entitled "Aspirating Face Seal with Axially Extending Seal Teeth" discloses a gas turbine engine aspirating face seal including a rotatable engine member and a non-rotatable engine member and a leakage path therebetween. Annular generally planar rotatable and non-rotatable gas bearing face surfaces circumscribed about a centerline are operably associated to the rotatable and non-rotatable engine members respectively. Radially inner and outer tooth rings axially extend away from a first one of the rotatable and non-rotatable gas bearing face surfaces across the leakage path and towards a second one of the gas bearing face surfaces. An auxiliary seal includes an annular restrictor tooth extending radially across the leakage path from a second one of the rotatable and non-rotatable gas bearing face surfaces towards the first one of the rotatable and non-rotatable gas bearing face surfaces. A pull-off biasing means is used for urging the inner and outer tooth rings axially away from the second one of the gas bearing face surfaces.

Known seal designs have also included an aspirator tooth extending from the stator axially across, and radially inward of, the air dam with the aspirator tooth having a tip spaced apart from and proximate the rotor. It is also important to note that aspirating face seal technology uses phrases such as "air bearing", "air dam", and "air flow", wherein it is understood that the word "air" is used to describe the working fluid of the seal. The working fluid of an aspirating face seal can include, without limitation, compressed air, combustion gases, and/or steam. Note, that an aspirating face seal is a non-contacting seal in that the first and second parts of the seal are not suppose to touch but often do for short periods of time during which they experience what are known as rubs.

When the primary tooth is on the stator, the air jet from the primary tooth forms an air curtain and reduces the venting effectiveness of a plurality of circumferentially spaced apart vent passages or inclined holes through the face seal ring which provide a path for air exiting the primary tooth to pass to the low pressure side of the seal. Additional tilt moments due to rotor and stator eccentricity may also be generated. Assembly of such seals is also difficult. Engine transients may lead to coning of the seal which cone flat annular seal faces.

It is desirable that aspirating face seals be able to better control deflections of the force generation areas and air pressure on different portions of the seal which affect force balance. It is desirable that aspirating face seals be well ventilated at all engine operating conditions and minimize tilt moments due to rotor and stator eccentricity.

BRIEF DESCRIPTION OF THE INVENTION

A turbomachine aspirating face seal assembly includes an aspirating face seal operable for restricting leakage of high pressure air from a relatively high pressure region of the turbomachine to a relatively low pressure region of the turbomachine at a juncture between a non-rotatable member of the turbomachine and a rotatable member of the turbomachine. The rotatable and non-rotatable members include gas bearing rotatable and non-rotatable face surfaces respectively. A primary seal tooth is mounted on the non-rotatable member and a starter seal tooth is mounted on a seal teeth carrier on the rotatable member.

The primary and starter seal teeth may be annular labyrinth seal teeth designed and operable to sealingly engage corresponding abradable primary and starter seal lands on the rotatable and non-rotatable members respectively.

An annular slider may be axially slidingly mounted on the non-rotatable member and the starter seal land and the non-rotatable face surface are mounted on the slider. A pull-off biasing means is provided for urging the annular slider away from the rotatable member, the non-rotatable face surface away from the rotatable surface, and the primary seal tooth away from the primary seal land during low or no power conditions of the turbomachine.

The seal may include a secondary seal in sealing engagement with an annular radially inner slider surface of the annular slider in the low pressure region and the pull-off biasing means located radially outwardly of the annular slider in the high pressure region.

The pull-off biasing means may include a plurality of circumferentially spaced apart coil springs disposed within spring chambers of circumferentially spaced apart cartridges, annular housings surrounding the spring chambers and attached to the annular non-rotatable member, and forward ends of the coil springs resting against axially forward static stop fingers extending radially outwardly from and attached to or part of the annular slider. Tongues may extend radially inwardly from the housings into grooves in the annular slider. The cartridges may be attached to an annular flange around and fixed to the annular non-rotatable member. The seal may further include pairs of lugs extending radially outwardly from the annular flange, lug bolt holes disposed through the lugs, ear bolt holes through ears attached to the cartridges, and bolts disposed through the ear bolt holes and through the lug bolt holes.

The annular slider may include a central ring and annular forward and aft extensions extending forwardly and aftwardly respectively from the central ring, the biasing means positioned radially outwardly of the forward extension, and the secondary seal positioned radially inwardly of the forward extension. The starter seal land is carried on the annular aft extension, the non-rotatable face surface is mounted on a radially inner aftwardly extending annular ledge of the central ring, first and second pluralities of circumferentially spaced apart first and second vent passages respectively extend through the central ring, the second vent passages extend substantially radially inwardly through the annular ledge, and a deflector seal tooth mounted on the seal teeth carrier is oriented to direct bearing airflow from a gas bearing space extending axially between the non-rotatable and rotatable face surfaces towards the first and second vent passages.

Air feed passages may extend radially inwardly from the high pressure region through the central ring and through the non-rotatable face surface to the gas bearing space.

A drain assembly may be provided for preventing oil from flowing into the aspirating face seal and may include a drain hole in the non-rotatable member located upstream or forward of the aspirating face seal and the secondary seal, a radially inwardly sloping inner surface of the non-rotatable member, and the radially inwardly sloping inner surface extending at least between the drain hole and the aspirating face seal and tapering radially inwardly between the drain hole and the aspirating face seal. An annular oil dam may depend from an aft or downstream end of the non-rotatable member and located upstream or forward of the aspirating face seal. The non-rotatable member may be coupled to an annular frame and a bearing supported by the frame may be in an annular sump bounded by a sump member located radially inwardly of the non-rotatable member.

BRIEF DESCRIPTION OF THE DRAWINGS

FIG. 4A is a cross-sectional view illustration of flows through the aspirating gas bearing face seal illustrated in FIG. 4 in a partially open position.

DETAILED DESCRIPTION OF THE INVENTION

Figure 1:
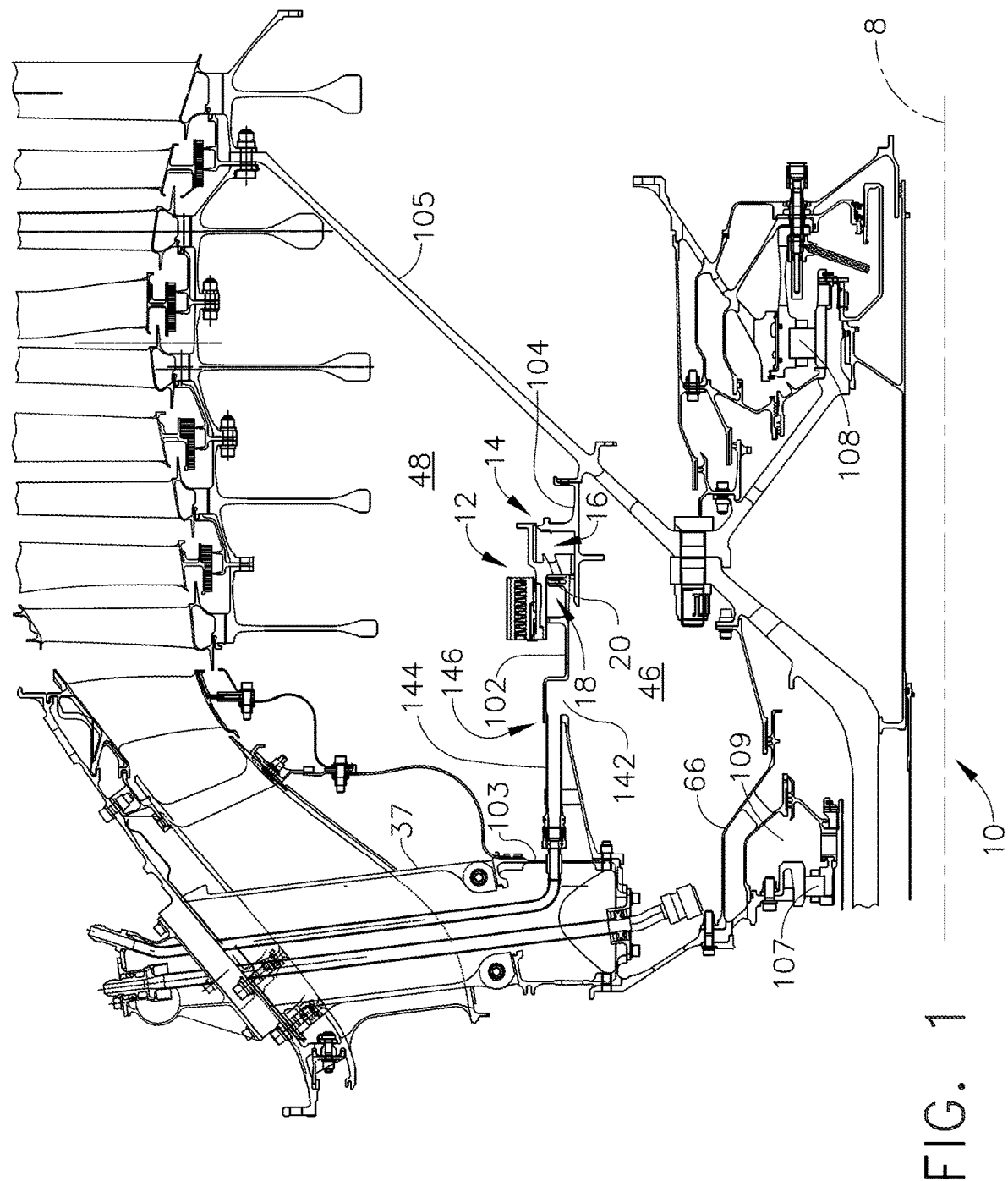
FIG. 1 is a cross-sectional view illustration of a portion of an exemplary gas turbine engine with a first exemplary embodiment of an aspirating gas bearing face seal with primary, starter, and deflector seal teeth mounted on a rotor of the engine.
Figure 2:
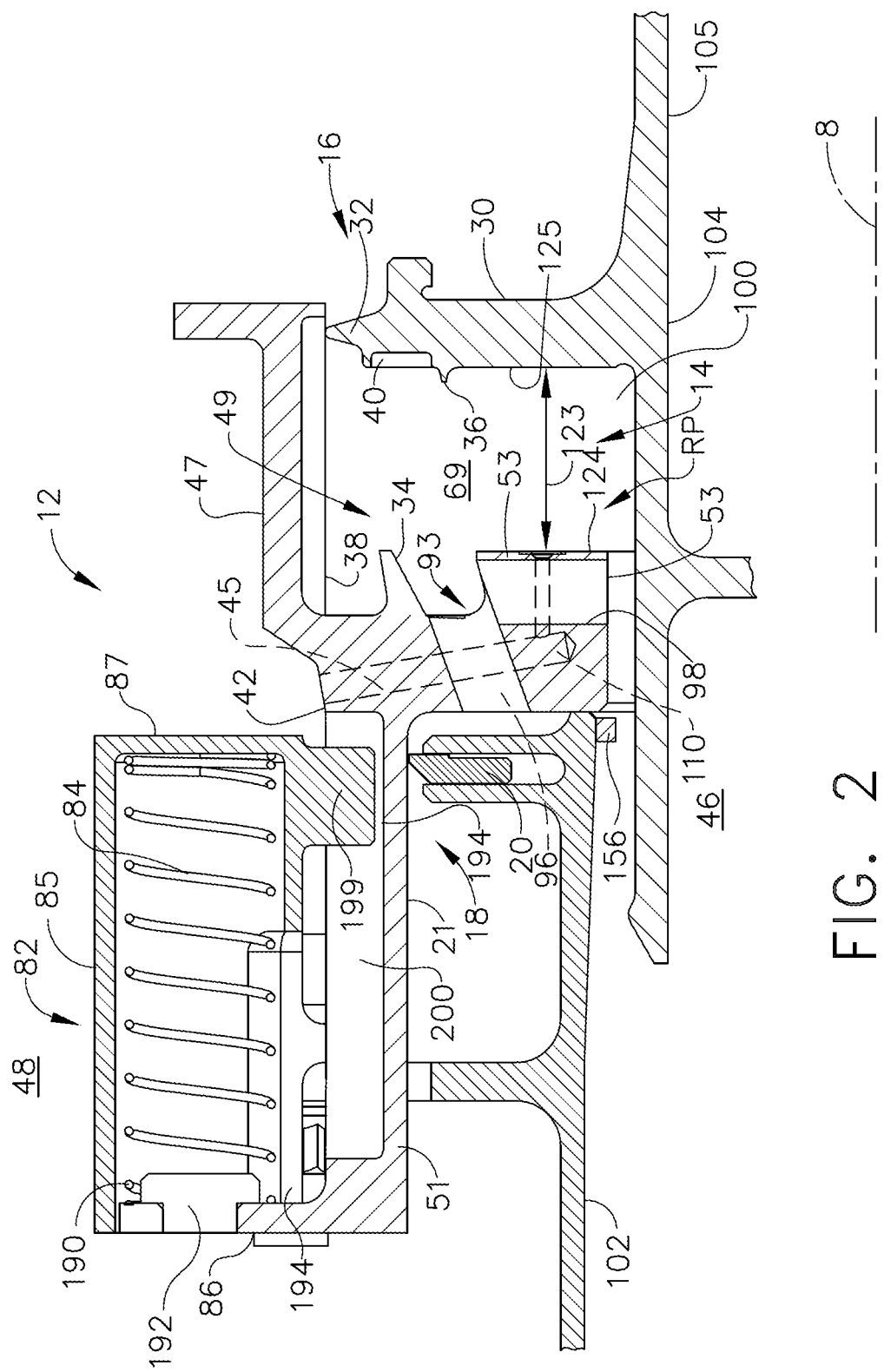
FIG. 2 is an enlarged cross-sectional view illustration of the aspirating gas bearing face seal illustrated in FIG. 1 in an opened engine off position.
Figure 3:
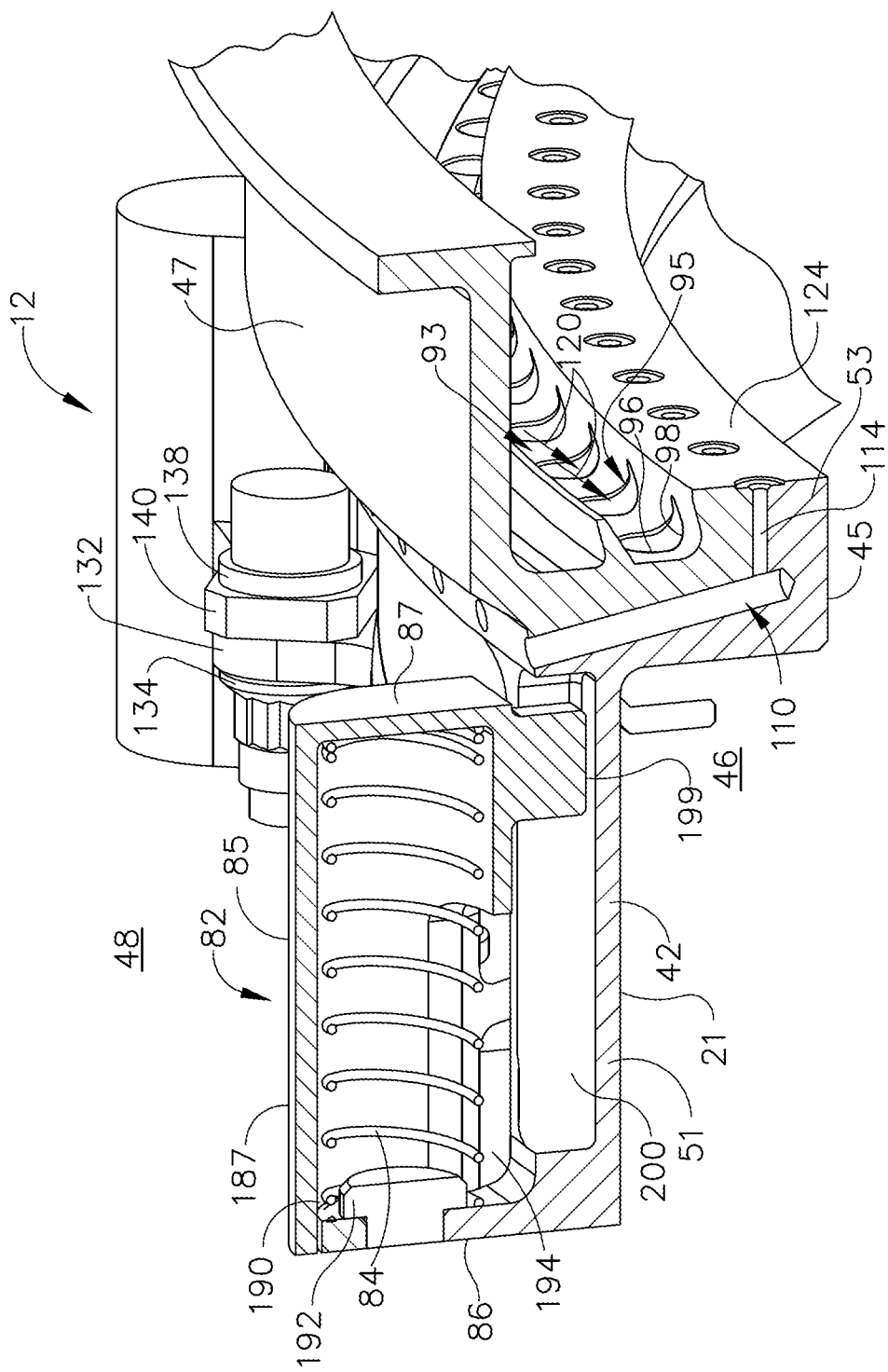
FIG. 3 is a cut-away perspective view illustration of a stator portion of the aspirating gas bearing face seal illustrated in FIG. 2.

Illustrated in FIGS. 1-3 is a first exemplary embodiment of an aspirating face seal assembly 12 having a primary seal 14 which is an annular aspirating face seal 16 and a secondary seal 18 which is illustrated herein as including a piston ring 20. The seal assembly 12 is designed for controlling leakage or sealing between a high pressure region 48 and a low pressure region 46 such as may be found in a turbomachine such as a gas turbine engine 10. Turbomachines include but are not limited to steam turbines, compressors and turbocompressors such as may be used in the gas and oil industry, or similar apparatus.

In the exemplary embodiment, turbomachine or gas turbine engine 10 is circumscribed about a centerline axis 8 of the engine 10 and includes an annular stationary stator or non-rotatable member 102 coupled to an annular frame 103 and a rotating or rotatable member 104 at least in part rotatably supported by an aft bearing 108. The frame 103 is illustrated herein as an annular turbine center frame 37 circumscribed about the centerline axis 8 of the engine 10. Additionally, non-rotatable member 102 is a stationary annular member circumscribed about the centerline axis 8 of the gas turbine engine 10. In the embodiments illustrated herein, non-rotatable member 102 is bolted to the frame 103 and the rotatable member 104 is part of a rotor 105 that is rotatably coupled within engine 10 to rotate about the centerline axis 8. The high pressure region 48 is located radially outwardly of the low pressure region 46 and the non-rotatable member 102 is located radially between the high and low pressure regions 48, 46. The frame 103 supports a middle bearing 107 in an annular sump 109 bounded by a generally conical sump member 66 located radially inwardly of the non-rotatable member 102.

A drain hole 142 in the non-rotatable member 102 is located upstream or forward of the aspirating face seal 16 and the secondary seal 18. A drain tube 144 is connected to and in fluid communication with drain hole 142. The drain tube 144 and the drain hole 142 provides a drain assembly 146 to help prevent oil from flowing into the aspirating face seal 16.

Figure 12:
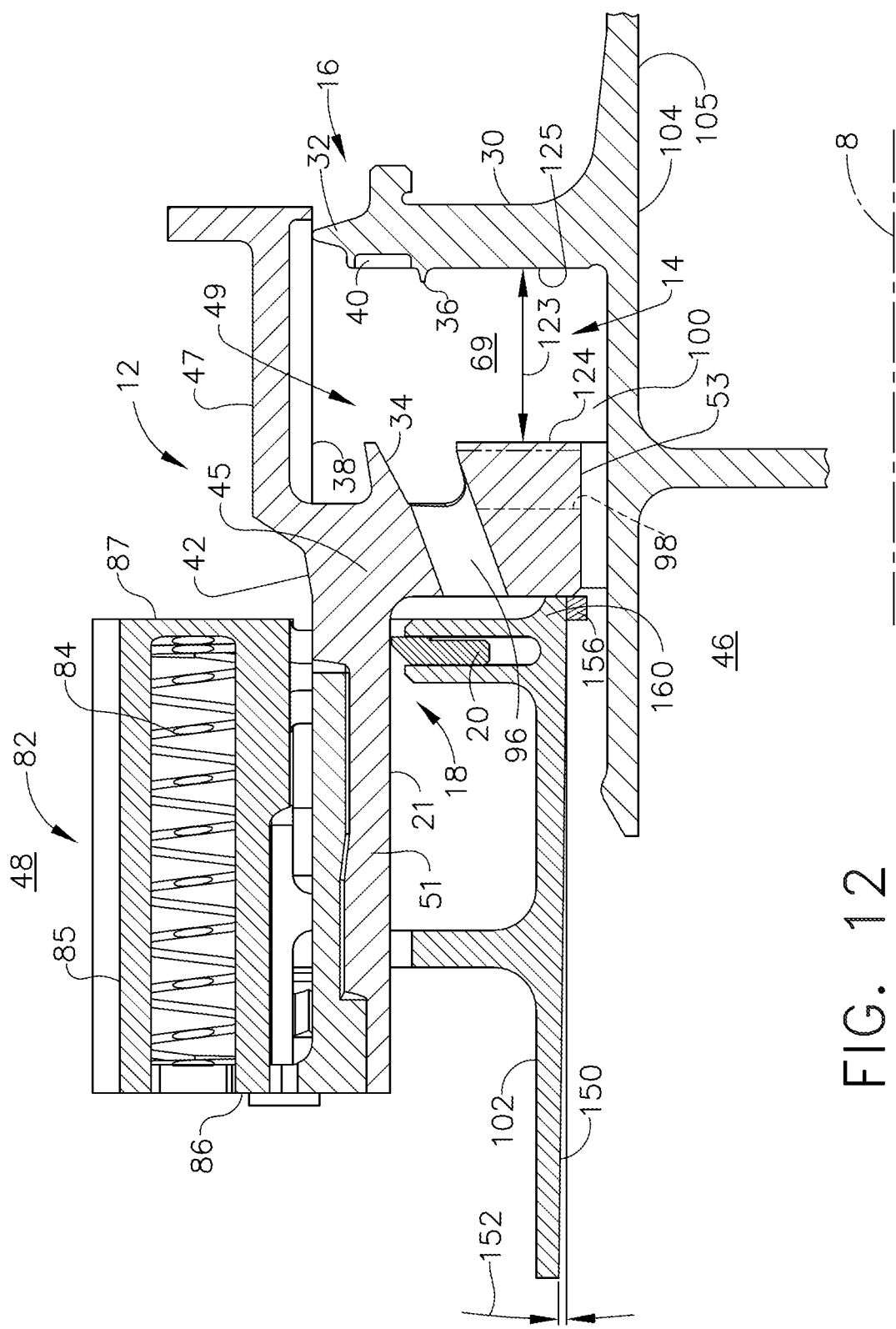
FIG. 12 is a cross-sectional view illustration of an alternative embodiment of the aspirating gas bearing face seal illustrated in FIG. 2 with an oil dam on the stator.

FIG. 12 illustrates another feature designed to help prevent oil from flowing into the aspirating face seal 16. A radially inwardly sloping inner surface 150 of the non-rotatable member 102 extends forwardly and opens radially outwardly at least from the aspirating face seal 16 to the drain hole 142. The radially inwardly sloping inner surface 150 extending at least between the drain hole 142 and the aspirating face seal 16 tapers radially inwardly between the drain hole 142 and the aspirating face seal 16. The sloping inner surface 150 may be conical and taper radially inwardly from the drain hole 142 to the aspirating face seal 16. This provides the inner surface 150 with a constant negative slope 152 with respect to the centerline axis 8. The slope 152 may be small such as about negative two degrees to minimize impact on the design of the stator. An annular oil dam 156 may depend from an aft or downstream end 160 of the non-rotatable member 102 and be located forward or upstream of the aspirating face seal 16. The oil dam 156 is spaced radially apart from the rotatable member 104 and helps prevent oil from being ingested into the aspirating face seal 16.

Referring to FIGS. 1-3, the aspirating face seal 16 is used to restrict leakage of high pressure air 120 from the relatively high pressure region 48 to a relatively low pressure region 46 at the juncture 49 between the non-rotatable member 102 and the rotatable member 104. The rotatable and non-rotatable face surfaces 125, 124 are circumscribed around and generally perpendicular to the engine centerline axis 8. Non-contact sealing during engine operation is obtained with the help of an air bearing film formed between the rotatable and non-rotatable face surfaces 125, 124 which function as a slider bearing face and a rotor bearing face respectively.

The embodiment of the aspirating face seal 16 illustrated in FIGS. 2 and 3 includes a rotatable seal teeth carrier 30 in the form of a flange on the rotatable member 104 of the rotor 105. The rotatable face surface 125 is on the carrier 30. A primary seal tooth 34 is mounted on an annular slider 42 which in turn is axially slidingly mounted on the annular non-rotatable member 102 illustrated in FIGS. 2 and 3. Starter and deflector seal teeth 32, 36 are mounted radially outwardly of the rotatable face surface 125 on the seal teeth carrier 30. The primary and starter seal teeth 34, 32 are annular labyrinth seal teeth designed and operable to sealingly engage corresponding abradable primary and starter seal lands 40, 38.

The primary seal land 40 faces axially forwardly from and is mounted on the seal teeth carrier 30. The primary seal land 40 located radially outwardly of the rotatable face surface 125 and the deflector seal tooth 36. The annular slider 42 includes a central ring 45 and annular forward and aft extensions 51, 47 extending forwardly and aftwardly respectively from the central ring 45. The starter seal land 38 is mounted on the aft extension 47 of the annular slider 42 which is axially slidingly mounted on the annular non-rotatable member 102 illustrated in FIGS. 2 and 3. The starter seal land 38 faces radially inwardly axially and is recessed radially into the aft extension 47. The non-rotatable face surface 124 is mounted on a radially inner aftwardly extending annular ledge 53 of the central ring 45.

The primary seal tooth 34 extends axially aftwardly from the annular slider 42 radially between the aft extension 47 and the central ring 45 of the annular slider 42. The deflector seal tooth 36 extends axially aftwardly from the seal teeth carrier 30. The starter seal tooth 32 extends substantially radially from the teeth carrier 30 and substantially normal to the centerline axis 8 of the engine 10. The abradable primary and starter seal lands 40, 38 may be made of or include an abradable material. The abradable material may be a honeycomb material, thermal spray abradable material such as nickel graphite, or other abradable material.

The non-rotatable face surface 124 is located radially inwardly of the primary seal tooth 34 on the annular slider 42 and is substantially parallel to the rotatable face surface 125 on the rotatable member 104. The non-rotatable and rotatable face surfaces 124, 125 are axially spaced apart a variable distance 123 and cooperate to axially move the slider 42 axially under a pressure differential between the high and low pressure regions 48, 46. A variable axial length annular plenum 69 extends axially between the slider 42 and the rotatable face surface 125. A gas bearing space 100 extends axially between the non-rotatable and rotatable face surfaces 124, 125.

Figure 4:
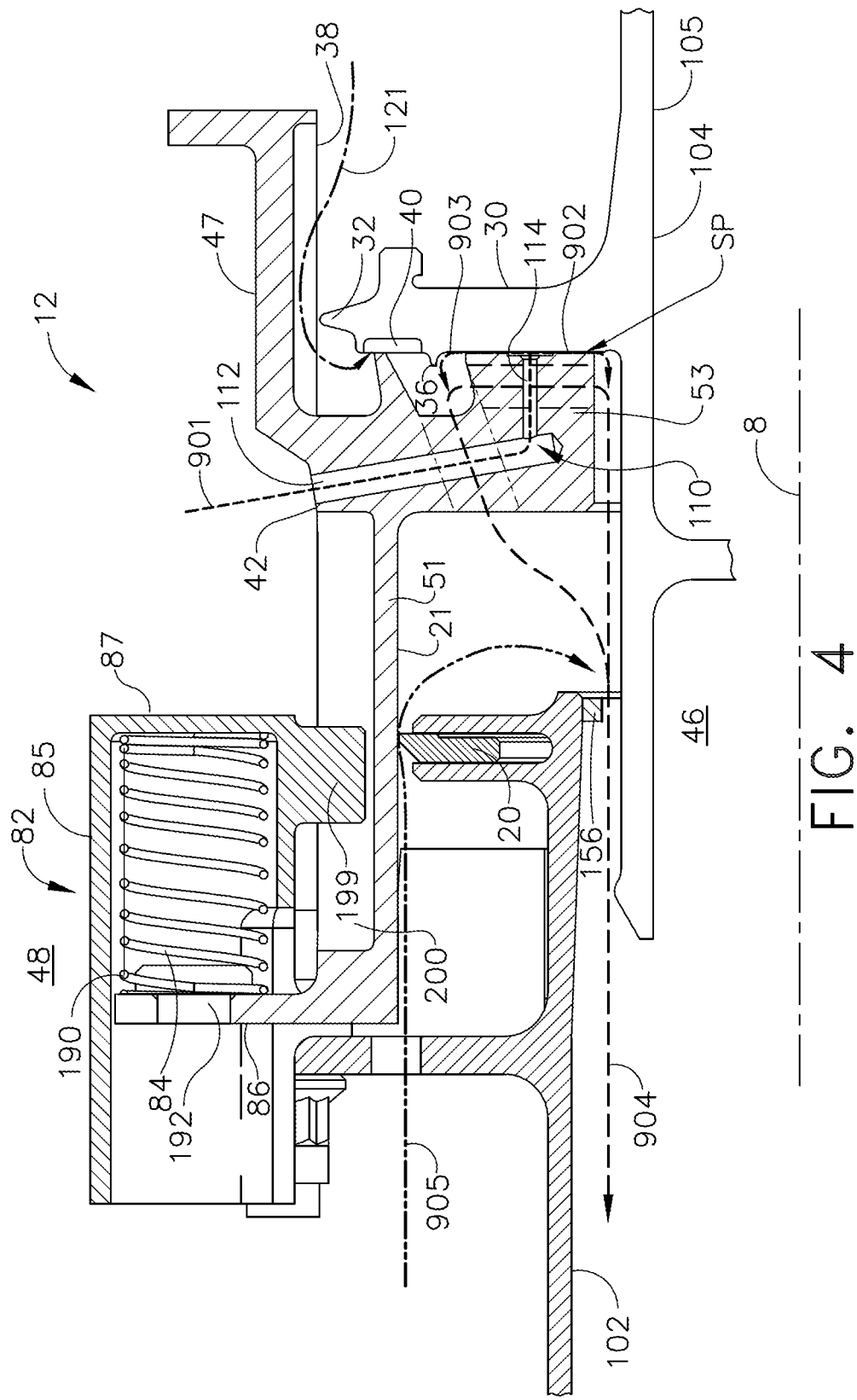
FIG. 4 is a cross-sectional view illustration of the aspirating gas bearing face seal illustrated in FIG. 2 with feed holes extending radially inwardly through an aft ring of the stator of the aspirating gas bearing face seal in a closed position.
Figure 5:
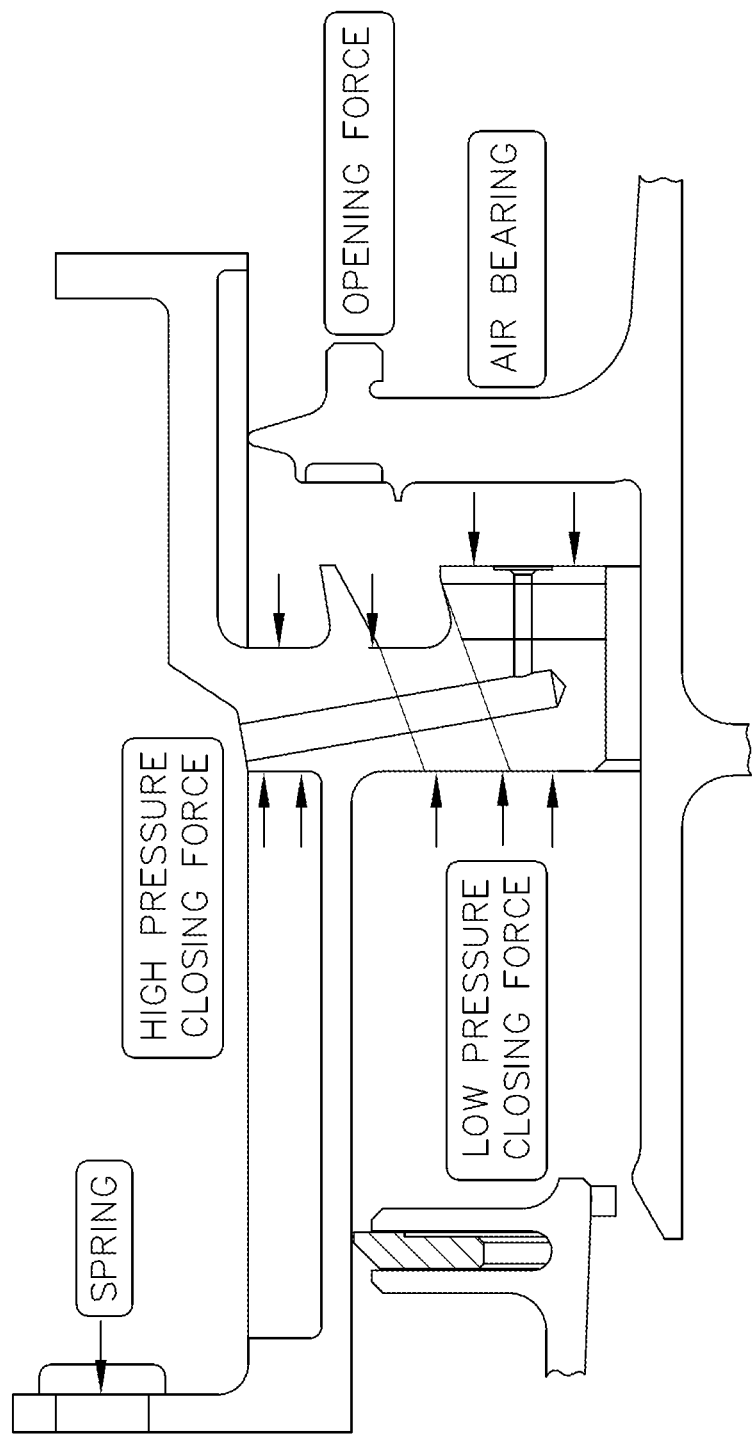
FIG. 5 is a diagrammatical illustration of forces acting on the aspirating gas bearing face seal illustrated in FIG. 4.
Figure 6:
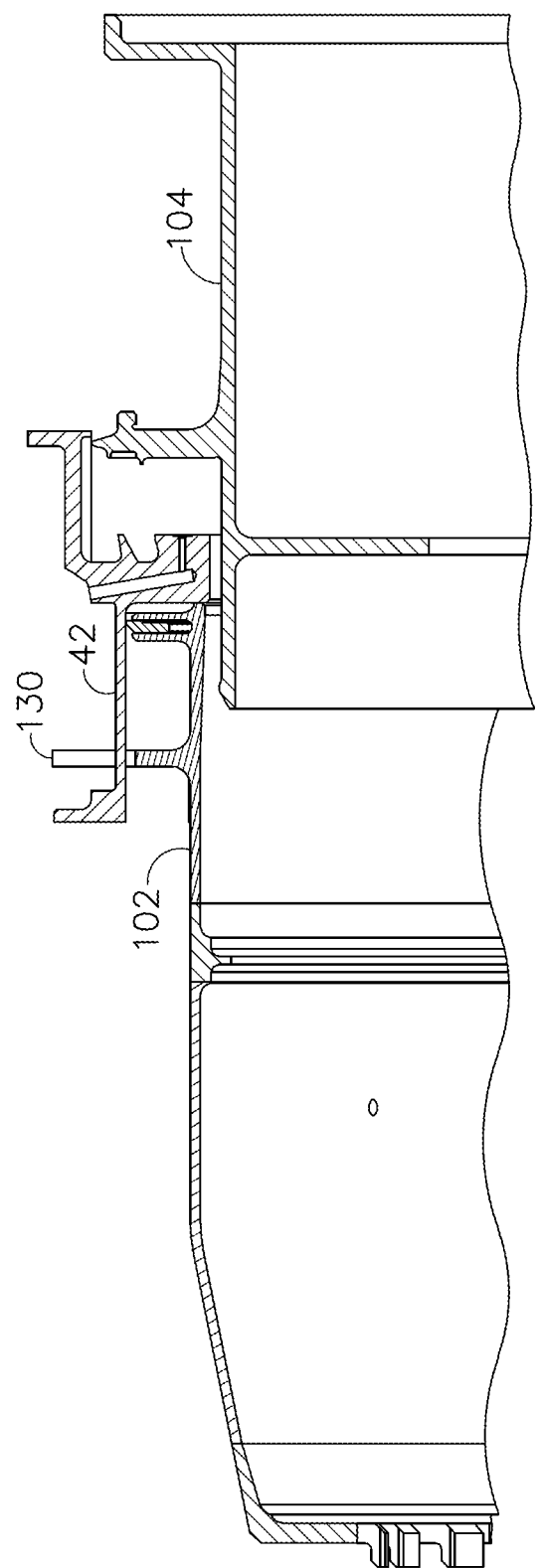
FIG. 6 is a cross-sectional view illustration of the aspirating gas bearing face seal assembly illustrated in FIG. 4.
Figure 7:
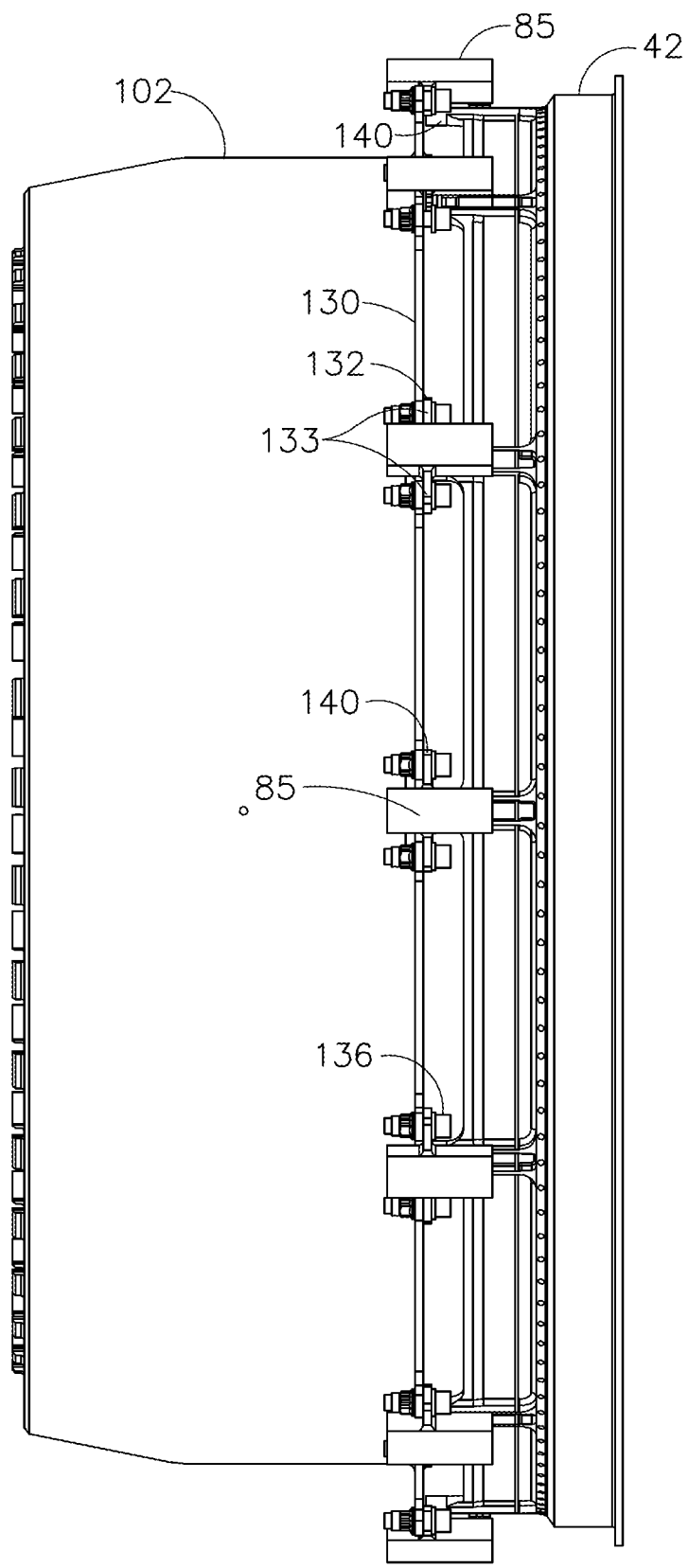
FIG. 7 is a radially inwardly looking perspective view illustration of the aspirating gas bearing face seal assembly illustrated in FIG. 6.
Figure 8:
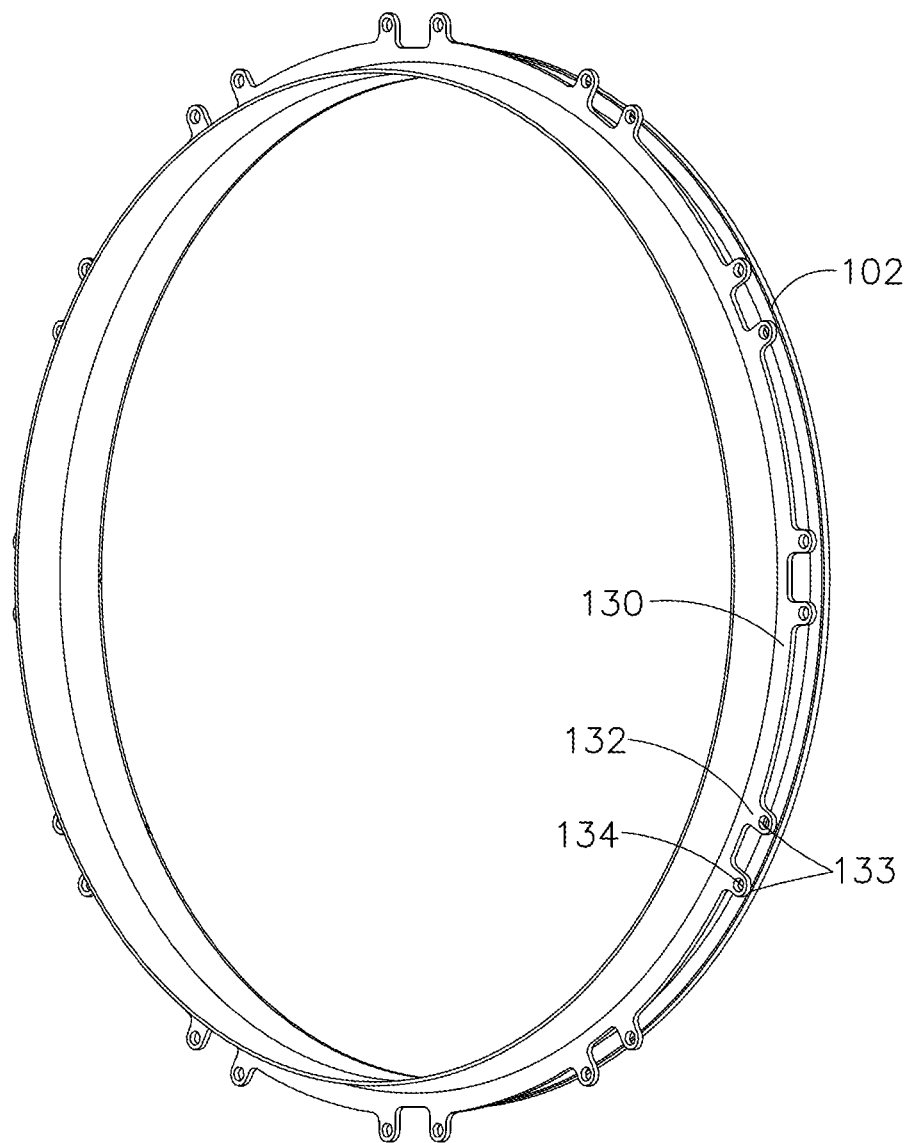
FIG. 8 is perspective view illustration of an annular flange around and fixed to the stator illustrated in FIG. 3.
Figure 9:
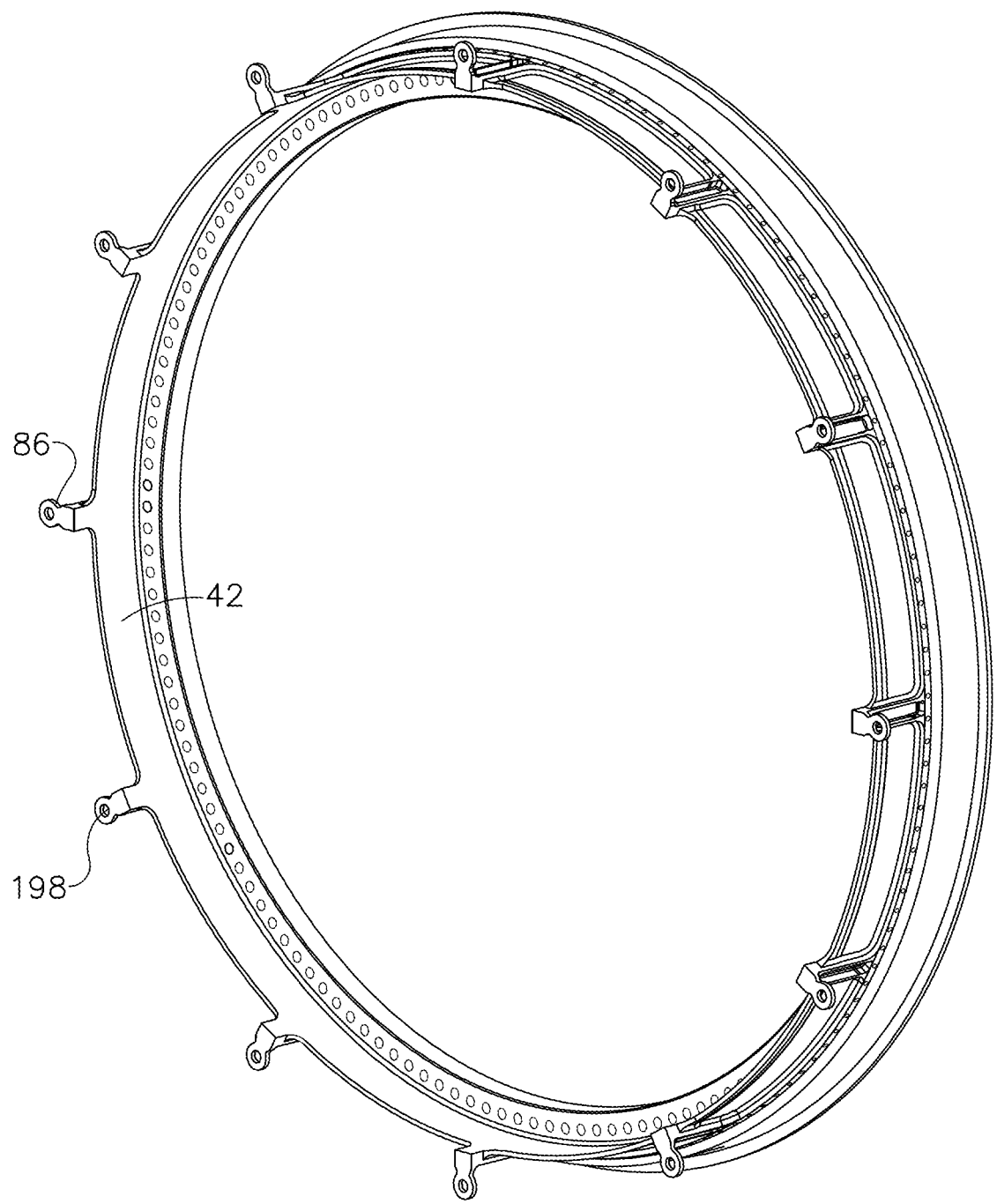
FIG. 9 is perspective view illustration of the slider illustrated in FIG. 3.
Figure 10:
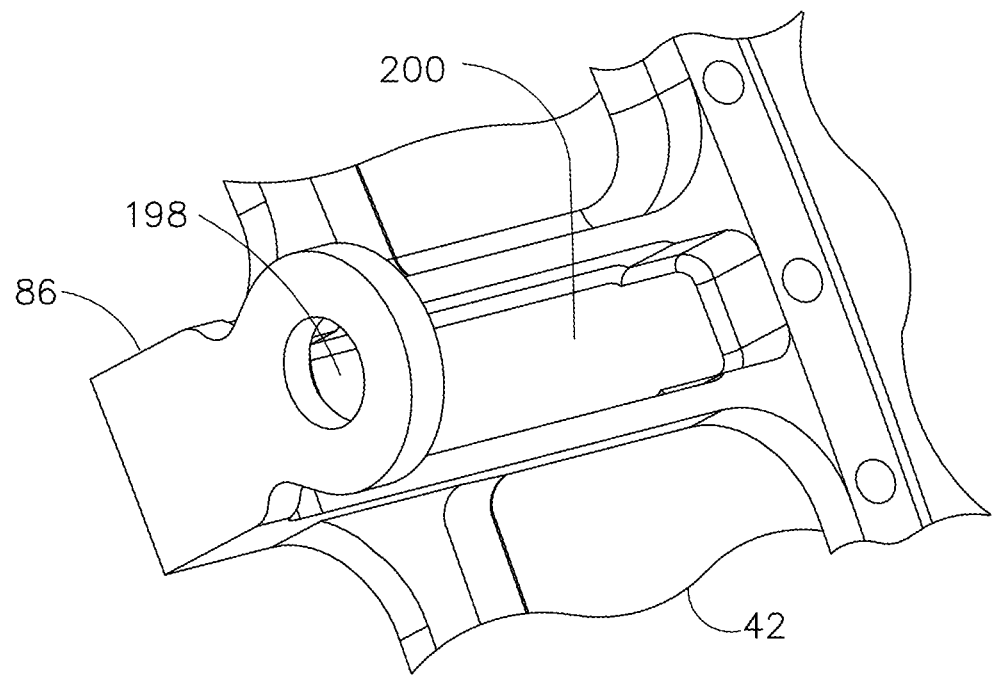
FIG. 10 is perspective view illustration of a groove in the slider for receiving a tongue extending inwardly from a housing of a spring cartridge illustrated in FIG. 3.
Figure 11:
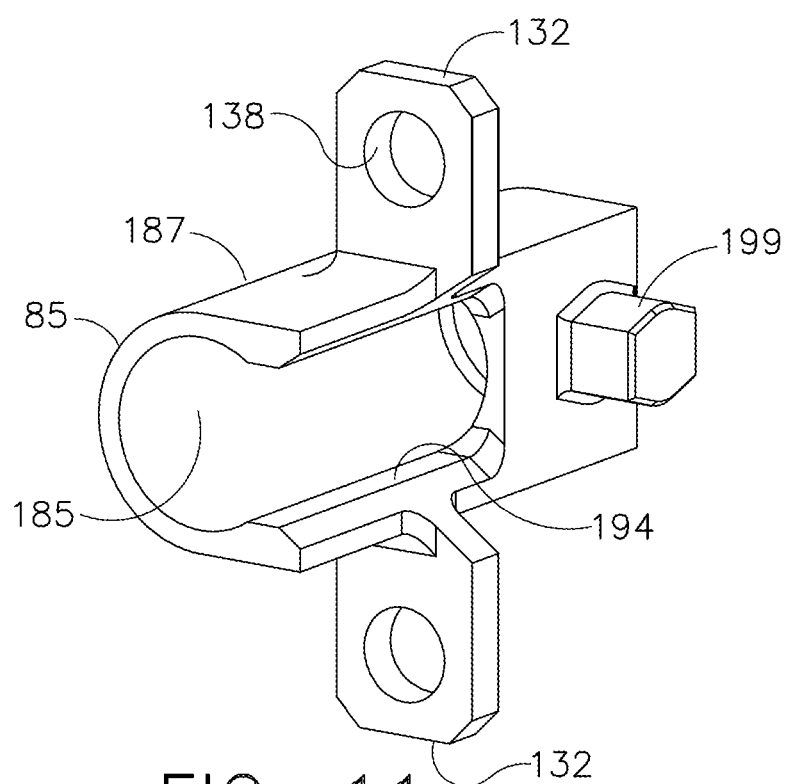
FIG. 11 is perspective view illustration of the housing of the spring cartridge mounted to the flange illustrated in FIG. 3.

Referring to FIGS. 3-5, air feed passages 110 extend through the central ring 45 of the annular slider 42 and from the high pressure region 48 to the gas bearing space 100 between the non-rotatable and rotatable face surfaces 124, 125. The exemplary embodiment of the feed passages 110 illustrated herein includes feed holes 112 extending generally radially inwardly from the high pressure region 48 through the central ring 45 to corresponding axially extending orifice bores 114 in the central ring 45. The orifice bores 114 extend axially through the central ring 45 from the feed holes 112 through the non-rotatable face surface 124 to the gas bearing space 100.

First and second pluralities 93, 95 of circumferentially spaced apart first and second vent passages 96, 98 through the central ring 45 of the annular slider 42 provide pressure communication between the plenum 69 and low pressure region 46. The first and second vent passages 96, 98 vent the plenum 69 with low pressure air from the low pressure region 46 during engine operation when there is a substantial pressure differential between high and low pressure regions 48, 46. The first vent passages 96 are inclined radially inwardly and extend from the plenum 69 forward and radially inwardly. The second vent passages 98 extend substantially radially inwardly from the plenum 69 through the annular ledge 53 of the central ring 45 of the annular slider 42.

The starter seal tooth 32 is used to initiate closure of the aspirating face seal 16. During failure modes, a starter tooth/land gap may close significantly. Failure modes may include large pressure imbalance between the high and low pressure regions 48, 46, large radial relative displacements between rotating and stationary components would be caused by a large imbalance of the rotating assembly. The starter tooth 32 is located on the seal teeth carrier 30 mounted to the rotor 105 and extends radially towards the non-rotatable abradable starter seal land 38. This design allows the starter tooth to rub into an abradable during high radial excursions rather than have metal to metal contact. The deflector seal tooth 36 is used to help reduce build-up of interior pressures in the gas bearing space 100 and the annular plenum 69 between the stationary and rotating seal surfaces.

FIG. 4A illustrates various air flows through the aspirating face seal 16 during engine operation when the aspirating face seal 16 is partially open. Gaps between the primary and starter seal teeth 34, 32 and the primary and starter seal lands 40, 38 respectively allow room to draw flows between the teeth and lands. Bearing flow 901 comes from the high pressure region 48 through the air feed passages 110 into the gas bearing space 100 between the non-rotatable and rotatable face surfaces 124, 125. The bearing flow 901 exits the gas bearing space 100 as radially outward bearing flow 903 and radially inward bearing flow 902. The radially outward bearing flow 903 passes through the first and second vent passages 96, 98 and together with the radially inward bearing flow 902 passes through a gap between the rotatable member 104 of the rotor 105 and the non-rotatable member 102 to reach the low pressure region 46.

Primary seal flow 121 leaks or flows between the primary seal tooth 34 and the primary seal land 40 and then between the starter seal tooth 32 and the starter seal land 38. During engine operating conditions with the aspirating face seal 16 closed the primary seal tooth 34 is the main restriction to air flow through the aspirating face seal 16. The primary seal leakage or primary seal flow 121 merges with the bearing flow 901 in the annular plenum 69 and the merged flows exit the aspirating face seal 16 as axial and radially inward vent flows 904, 905 passing through the first and second vent passages 96, 98 respectively. The merged flows then passes through the gap between the rotatable member 104 of the rotor 105 and the non-rotatable member 102 to reach the low pressure region 46.

The primary seal flow 121 across the primary seal tooth 34 and radially outward bearing flow 903 enter the plenum 69 as jets due to a pressure drop across the aspirating face seal 16 from the high pressure region 48 to the low pressure region 46. The primary seal flow 121 exits the gap between the primary seal tooth 34 and the primary seal land 40 traveling substantially radially inward towards the first and second vent passages 96, 98. The radially outward bearing flow 903 enters the plenum 69 traveling radially outwardly and is redirected by deflector tooth 36 towards the first and second vent passages 96 and 98. The radially outward bearing flow 903 and the primary seal flow 121 merge into the axial and radially inward vent flows 904, 905 which flow out from plenum 69 through the first and second vent passages 96, 98 respectively to the low pressure region 46.

The redirection of radially outward bearing flow 903 by the deflector tooth 36 increases penetration into the first and second vent passages 96, 98 causing a higher discharge coefficient (Cd) and greater effective passage area. This causes the air pressure in plenum 69 to approach that of the low pressure region 46. Similarity in pressure between plenum 69 and the low pressure region creates a more stable force balance acting on slider 42 which results in a more determinate operating clearance between air bearing surfaces. Cd is a standard engineering ratio used to find the effective area of a hole or passage that a fluid is passing through, i.e actual area*Cd=effective area. A perfect Cd=1 but Cd for real holes are something lower than that.

The bearing airflow across the primary seal tooth 34 is a jet of air due to a pressure drop across the primary tooth and is directed away from the first and second vent passages 96, 98 in the slider 42. Pressure in the annular plenum 69 drops faster and the closing process will be more determinate. The deflector seal tooth 36 is located downstream and radially inwardly of the primary seal tooth 34 and radially outwardly of the non-rotatable face surface 124. The deflector seal tooth 36 directs the bearing airflow jet into the first and second vent passages 96, 98 at close clearances between the stationary and rotating seal surfaces, helps maintain the effectiveness of the aspirating face seal 16, and aids the exhaust of the vent flow 904 to create a more determinant pressure in plenum 69.

During higher power operation, the primary seal tooth 34 restricts the air 120 flowing from the relatively high pressure region 48 to the relatively low pressure region 46, thereby, causing an increase in the pressure differential between high and low pressure regions 48, 46. A high pressure differential between high and low pressure regions 48, 46 acts on areas of the slider 42 upstream of the starter tooth 32 resulting in a net axial force that urges slider 42 and the primary and starter seal lands 40, 38 located on the slider 42 toward the rotatable face surface 125 on the rotatable member 104 and the primary, starter, and deflector seal teeth 34, 32, 36. The aspirating face seal 16 is illustrated in the open position in FIG. 4 and in the closed position in FIG. 5.

A pull-off biasing means 82 is used for urging the annular slider 42 and the non-rotatable face surface 124 and the starter seal land 38 thereon axially away from the rotating seal surface and the primary, starter, and deflector seal teeth 34, 32, 36 on the rotatable member 104 during low or no power conditions. During low or no power conditions, the slider 42 and the non-rotatable face surface 124 are biased away from the rotatable face surface 125 or the rotating seal surface on the rotatable member 104 by the biasing means 82. This causes the gas bearing space 100 and the annular plenum 69 to axially lengthen and the primary seal tooth 34 to retract from the primary seal land 40 on the slider 42.

Referring to FIGS. 3-11, the biasing means 82 is illustrated herein as a plurality of circumferentially spaced apart coil springs 84 disposed within spring chambers 185 of circumferentially spaced apart cartridges 85. The coil springs 84 are precompressed within the spring chambers 185 and are used to retract the slider 42 when the engine is shut down. Each of the cartridges 85 includes an annular housing 187 surrounding the spring chamber 185 attached to the annular non-rotatable member 102. An aft end wall 87 of the annular housing 187 my be attached to the annular non-rotatable member 102. A forward end 190 of the coil spring 84 rests against an axially forward static stop finger 86 which extends radially outwardly from and is attached to or part of the axially translatable annular slider 42 as further illustrated in FIG. 9. The stop finger 86 may be integrally formed with the axially translatable annular slider 42 as illustrated herein. A plug 192 disposed in an aperture 198 in the stop finger 86 extends into the chamber and anchors the coil spring 84 as illustrated in FIGS. 3-5.

The stop finger 86 extends radially through an axially extending slot 194 in the annular housing 187 into the spring chamber 185 as illustrated in FIGS. 3-4 and 10-11. This allows the slider 42 to translate axially and allow the coil spring 84 to compress and expand, thus, biasing the slider 42. A tongue 199 extends radially inwardly from the housing 187 into a groove 200 in the slider 42. This tongue and groove arrangement helps guide the axially translatable slider 42 during axial translation relative to the static housing 187 of the static cartridge 85. The slider 42 is thus capable of axial translation and limited gimballing motion in response to an axial force and tilt moments respectively.

Referring to FIGS. 3 and 6-11, the cartridge 85 is connected or attached to the annular non-rotatable member 102. The exemplary embodiment of the seal illustrated herein includes an annular flange 130 around and fixed to the annular non-rotatable member 102. The cartridges 85 are attached to the annular flange 130. The cartridges 85 may be attached to the annular flange 130 using pairs 133 of lugs 132 extending radially outwardly from the annular flange 130. The cartridges 85 may be bolted to the lugs 132 with bolts 136 disposed through ear bolt holes 138 through ears 140 attached to the cartridges 85 and through lug bolt holes 134 disposed through the lugs 132. Thus, the cartridges 85 may be removably mounted to the annular non-rotatable member 102. The annular flange 130 is illustrated herein as being continuous but may be segmented.

The biasing means 82 and the coil springs 84 are upstream, with respect to the bearing airflow in the gas bearing space 100, of the annular slider 42 and aspirating face seal 16 in the high pressure region 48. The biasing means 82 and the coil springs 84 are positioned upstream from the secondary seal 18 with respect to bearing airflow through the aspirating face seal 16. The biasing means 82 including the coil springs 84 and the secondary seal 18 are radially positioned on opposite sides of the forward extension 51. The forward extension 51 is radially disposed between the biasing means 82. The biasing means 82 including the coil springs 84 are positioned radially outwardly of the forward extension 51 and the secondary seal 18 is positioned radially inwardly of the forward extension 51. The secondary seal 18 is in sealing engagement with an annular radially inner slider surface 21 of the annular slider 42 and is located on a border between the high and low pressure regions 48, 46. The biasing means 82 and the coil springs 84 are located radially outwardly of the annular slider 42 and the secondary seal 18 is located radially inwardly of the annular slider 42. This helps to reduce pressure coning due to shape and/or length of the non-rotatable face surface 124 on the annular slider 42.

The central ring 45 of the annular slider 42 is designed to translate between axial retracted and sealing positions RP, SP illustrated in FIGS. 2 and 4 respectively as measured at the gas bearing non-rotatable face surface 124 as a result of forces, illustrated in FIG. 5, acting on the central ring 45. The central ring 45 is illustrated in its sealing position in FIG. 5. The forces are the result of pressures in the relatively low and high pressure regions 46, 48 acting on surfaces and spring forces of the biasing or biasing means 82.

As the engine is started, the compressor discharge pressure rises and the pressure in the high pressure region 48 begins to rise because the starter seal tooth 32 restricts the air 120 flowing from the relatively high pressure region 48 to the relatively low pressure region 46. The pressure differential between the low and high pressure regions 46, 48 results in a closing pressure force acting on central ring 45. The pressure force acts against a spring force from the biasing means 82 to urge the central ring 45 and non-rotatable face surface 124 mounted thereupon towards the gas bearing rotatable face surface 125. FIG. 5 illustrates high and low pressure closing forces acting on the aspirating face seal 16 during engine startup and how the closing forces overcomes the spring force. During shutdown of the engine, pressure in the low pressure region 46 drops off and the springs 84 of the biasing means 82 overcome the closing force and retract the aspirating face seal 16. Opening forces from high pressure air in the air bearing are also illustrated in FIG. 5.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A turbomachine aspirating face seal assembly comprising:
   an aspirating face seal operable for restricting leakage of high pressure air from a relatively high pressure region of the turbomachine to a relatively low pressure region of the turbomachine at a juncture between a non-rotatable member of the turbomachine and a rotatable member of the turbomachine, the rotatable and non-rotatable members including gas bearing rotatable and non-rotatable face surfaces respectively,
   a primary seal tooth mounted on the non-rotatable member,
   a starter seal tooth mounted on a seal teeth carrier on the rotatable member,
   an annular slider slidingly mounted in an axial orientation on the non-rotatable member; wherein the starter seal land and the non-rotatable face surface are mounted on the slider;
   a pull-off biasing means for urging the annular slider away from the rotatable member, the non-rotatable face surface away from the rotatable surface, and the primary seal tooth away from the primary seal land during low or no power conditions of the turbomachine, wherein the pull-off biasing means is located at a radial position of the annular slider in the high pressure region, and
   a secondary seal in sealing engagement with an annular, radially-inner slider surface of the annular slider in the low pressure region.

2. The seal assembly as claimed in claim 1 further comprising the primary and starter seal teeth being annular labyrinth seal teeth designed and operable to sealingly engage corresponding abradable primary and starter seal lands on the rotatable and non-rotatable members respectively.

3. The seal assembly as claimed in claim 2 further comprising:
   the pull-off biasing means including a plurality of circumferentially spaced apart coil springs disposed within spring chambers of circumferentially spaced apart cartridges,
   annular housings surrounding the spring chambers attached to the annular non-rotatable member, and
   forward ends of the coil springs resting against axially forward static stop fingers extending radially outwardly from and attached to or part of the annular slider.

4. The seal assembly as claimed in claim 3 further comprising tongues extending radially inwardly from the housings into grooves in the annular slider.

5. The seal assembly as claimed in claim 4 further comprising the cartridges attached to an annular flange around and fixed to the annular non-rotatable member.

6. The seal assembly as claimed in claim 5 further comprising:
   pairs of lugs extending radially outwardly from the annular flange,
   lug bolt holes disposed through the lugs,
   ear bolt holes through ears attached to the cartridges, and
   bolts disposed through the ear bolt holes and through the lug bolt holes.

7. The seal assembly as claimed in claim 2 further comprising:
   the annular slider including a central ring and annular forward and aft extensions extending forwardly and aftwardly respectively from the central ring,
   the biasing means positioned radially outwardly of the forward extension and the secondary seal positioned radially inwardly of the forward extension,
   the starter seal land carried on the annular aft extension,
   the non-rotatable face surface mounted on a radially inner aftwardly extending annular ledge of the central ring,
   first and second pluralities of circumferentially spaced apart first and second vent passages respectively extending through the central ring,
   the second vent passages extending substantially radially inwardly through the annular ledge, and
   a deflector seal tooth mounted on the seal teeth carrier and oriented to direct bearing airflow from a gas bearing space extending axially between the non-rotatable and a rotatable face surfaces towards the first and second vent passages.

8. The seal assembly as claimed in claim 7 further comprising air feed passages extending radially inwardly from the high pressure region through the central ring and through the non-rotatable face surface to the gas bearing space.

9. The seal assembly as claimed in claim 1 further comprising a drain assembly for preventing oil from flowing into the aspirating face seal.

10. The seal assembly as claimed in claim 2 further comprising:
- a drain hole in the non-rotatable member located upstream or forward of the aspirating face seal and the secondary seal,
- a radially inwardly sloping inner surface of the non-rotatable member, and
- the radially inwardly sloping inner surface extending at least between the drain hole and the aspirating face seal and tapering radially inwardly between the drain hole and the aspirating face seal.

11. The seal assembly as claimed in claim 10 further comprising an annular oil dam depending from an aft or downstream end of the non-rotatable member and located upstream or forward of the aspirating face seal.

12. The seal assembly as claimed in claim 6 further comprising:
- the annular slider including a central ring and annular forward and aft extensions extending forwardly and aftwardly respectively from the central ring,
- the biasing means positioned radially outwardly of the forward extension and the secondary seal positioned radially inwardly of the forward extension,
- the starter seal land carried on the annular aft extension,
- the non-rotatable face surface mounted on a radially inner aftwardly extending annular ledge of the central ring,
- first and second pluralities of circumferentially spaced apart first and second vent passages respectively extending through the central ring,
- the second vent passages extending substantially radially inwardly through the annular ledge, and
- a deflector seal tooth mounted on the seal teeth carrier and oriented to direct bearing airflow from a gas bearing space extending axially between the non-rotatable and rotatable face surfaces towards the first and second vent passages.

13. The seal assembly as claimed in claim 12 further comprising air feed passages extending radially inwardly from the high pressure region through the central ring and through the non-rotatable face surface to the gas bearing space.

14. The seal assembly as claimed in claim 13 further comprising a drain assembly for preventing oil from flowing into the aspirating face seal.

15. The seal assembly as claimed in claim 14 further comprising:
- a drain hole in the non-rotatable member located upstream or forward of the aspirating face seal and the secondary seal,
- a radially inwardly sloping inner surface of the non-rotatable member, and
- the radially inwardly sloping inner surface extending at least between the drain hole and the aspirating face seal and tapering radially inwardly between the drain hole and the aspirating face seal.

16. The seal assembly as claimed in claim 15 further comprising an annular oil dam depending from an aft or downstream end of the non-rotatable member and located upstream or forward of the aspirating face seal.

17. The seal assembly as claimed in claim 15 further comprising the non-rotatable member coupled to an annular frame and a bearing supported by the frame in an annular sump bounded by a sump member located radially inwardly of the non-rotatable member.

18. The seal assembly as claimed in claim 17 further comprising an annular oil dam depending from an aft or downstream end of the non-rotatable member and located upstream or forward of the aspirating face seal.

* * * * *